United States Patent
Seshadri Ramaswamy

(10) Patent No.: US 10,405,002 B2
(45) Date of Patent: Sep. 3, 2019

(54) LOW COMPLEXITY PERCEPTUAL VISUAL QUALITY EVALUATION FOR JPEG2000 COMPRESSED STREAMS

(71) Applicant: TEKTRONIX, INC., Beaverton, OR (US)

(72) Inventor: Krishna Seshadri Ramaswamy, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 15/264,820

(22) Filed: Sep. 14, 2016

(65) Prior Publication Data

US 2017/0099500 A1    Apr. 6, 2017

(30) Foreign Application Priority Data

Oct. 3, 2015    (IN) .......................... 3766/MUM/2015

(51) Int. Cl.
 *G06T 7/00*    (2017.01)
 *H04N 19/64*    (2014.01)
(52) U.S. Cl.
 CPC ........... *H04N 19/64* (2014.11); *G06T 7/0002* (2013.01)
(58) Field of Classification Search
 None
 See application file for complete search history.

(56) References Cited

U.S. PATENT DOCUMENTS

| | | | |
|---|---|---|---|
| 9,538,081 B1 * | 1/2017 | Zhou | H04N 5/23248 |
| 2004/0080626 A1 * | 4/2004 | Fukuzawa | G06K 15/002 |
| | | | 348/220.1 |
| 2004/0240742 A1 * | 12/2004 | Takahashi | H04N 19/105 |
| | | | 382/232 |
| 2010/0063803 A1 * | 3/2010 | Gao | G10L 21/0364 |
| | | | 704/205 |
| 2015/0169982 A1 * | 6/2015 | Perry | G06K 9/4671 |
| | | | 382/195 |

OTHER PUBLICATIONS

Pina Marziliano, et al., "A No-Reference Perceptual Blur Metric," IEEE 2002 International Conference on Image Processing.

(Continued)

*Primary Examiner* — Bernard Krasnic
(74) *Attorney, Agent, or Firm* — Miller Nash Graham & Dunn; Andrew J. Harrington

(57) ABSTRACT

A method of detecting image quality in a wavelet transform-encoded image includes receiving wavelet transform-encoded image data partitioned into tiles, each tile partitioned into a number of subbands, evaluating a number of wavelets in fewer than the number of subbands, assigning a measure to each of the subbands evaluated for each tile, using the measures to determine a perceptual visual quality score for the image, and adjusting operation of the decoder based upon the perceptual visual quality score. A decoding system includes a memory to receive wavelet-transformed compressed image data having a predetermined number of subbands, and a decoder to determine a number of wavelet coefficients in a subset of the predetermined number of subbands, measure an amount of blur in the image data based upon the number of wavelet coefficients, and adjust a decoding process based upon the amount of blur.

10 Claims, 3 Drawing Sheets

(56) References Cited

OTHER PUBLICATIONS

Hanghang Tong, et al., "Blur Detection for Digital Images Using Wavelet Transform," IEEE 2004, International Conference on Multimedia and Expo.
European Search Report, EP16192071.5, 10 pages, dated Feb. 23, 2017.
Rabbani et al., "An overview of the JPEG 2000 still image compression standard," Signal Processing: Image Communication 17 (2002) 3-48.
Deepti Koujalagi C., et al., "Blur Detection of Digital Images in Real-Time," International Journal of Current Engineering and Scientific Rsearch, vol. 2, Issue 9, (pp. 53-60), 2015.
Narayanan Ramakrishnan, Harish, "Detection and estimation of image blur," Masters Theses, Paper 4804, 2010, Scholar's Mine.
Marziliano, Pina et al., "Perceptual blur and ringing metrics: application to JPEG2000," Signal Processing: Image Communication 19 (2004), 163-172.

\* cited by examiner

LOW COMPLEXITY PERCEPTUAL VISUAL QUALITY EVALUATION FOR JPEG2000 COMPRESSED STREAMS

CROSS REFERENCE TO RELATED APPLICATION

This application claims benefit of, and priority to, Indian Provisional Application No. 3766/MUM/2015, "A LOW COMPLEXITY PERCEPTUAL VISUAL QUALITY EVALUATION METHOD FOR JPEG2000 COMPRESSED STREAMS," filed Oct. 3, 2015, which is incorporated by reference herein in its entirety.

TECHNICAL FIELD

This disclosure relates to decoding JPEG2000 images, and more particularly to evaluation of image quality resulting from the decoding.

BACKGROUND

The Joint Photographic Experts Committee (JPEG) has created different standards for compression of still images. The initial JPEG standard used discrete cosine transform compression. A newer version of JPEG, JPEG2000 also referred to as JPEG2K, relies upon a wavelet-based method. JPEG2K encoders encode the digital image data in accordance with this standard, compressing the file size for storage and/or transmission, and JPEG2K decoder can decode them prior to display or printing.

The JPEG2K codes streams may contain regions of interest that offer several mechanisms to support spatial random access or access at varying degrees of granularity, or resolution. This allows the decoder to adjust the level of resolution depending upon the quality of the image. The main visual artifact that reduces image quality in JPEG2K image is blur, which results from a loss of detail, mostly at the edges of objects in the image. Excessive low pass filtering typically causes the blur.

Image quality measures may take many forms, including Perceptual Visual Quality or PVQ. To maintain visual quality, it becomes important to quantify the numbers of artifacts introduces by the compression process.

SUMMARY

An embodiment consists of a method of detecting image quality in a wavelet transform-encoded image. The method includes receiving wavelet transform-encoded image data partitioned into tiles, each tile partitioned into a number of subbands, evaluating a number of wavelets in fewer than the number of subbands, assigning a measure to each of the subbands evaluated for each tile, using the measures to determine a perceptual visual quality score for the tile, and adjusting operation of the decoder based upon the perceptual visual quality score.

Another embodiment consists of a decoding system having a memory to receive wavelet-transformed compressed image data having a predetermined number of subbands, and a decoder to determine a number of wavelet coefficients in a subset of the predetermined number of subbands, measure an amount of blur in the image data based upon the number of wavelet coefficients, and adjust a decoding process based upon the amount of blur.

DETAILED DESCRIPTION OF THE EMBODIMENTS

Figure 1:
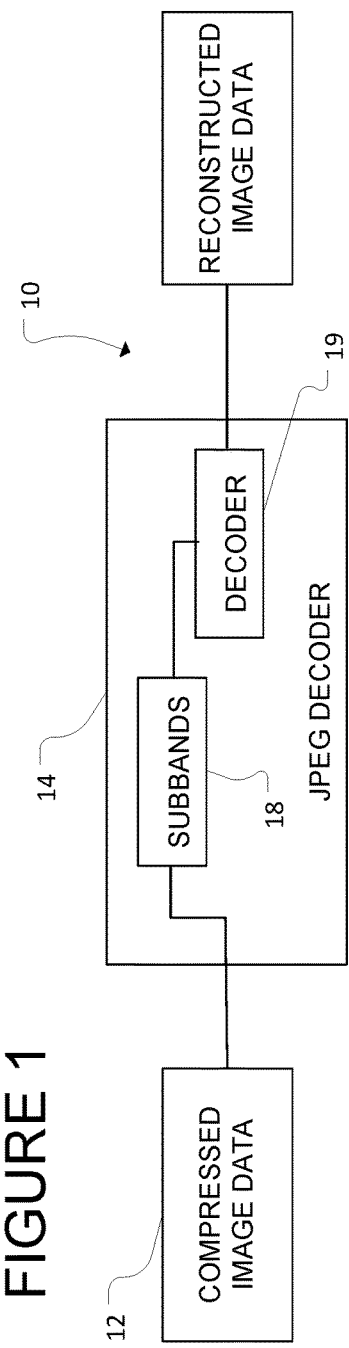
FIG. 1 shows an embodiment of an image decompression system.

FIG. 1 shows an embodiment of an image decompression system 10. Typically, the system is part of a larger image system that includes an encoder for encoding images to be transmitted from the system as well as received. The decoder may be implemented in a general purpose processor, but may also be a special purpose integrated circuit (chip). The decoder receives decoded image data 12 at a JPEG2000 (JPEG2K) decoder.

A JPEG2K encoder, on the transmission end, compresses the original data using a wavelet transform. The encoder partitions the image into 'tiles,' such as 20 in FIG. 2, which are analogous to the 8 pixel by 8 pixel blocks in the previous JPEG standard. The JPEG2K tiles are rectangular and all the same size. They each undergo encoding independently and represent different regions of original input image. The encoding results in four subbands for each tile.

Figure 2:
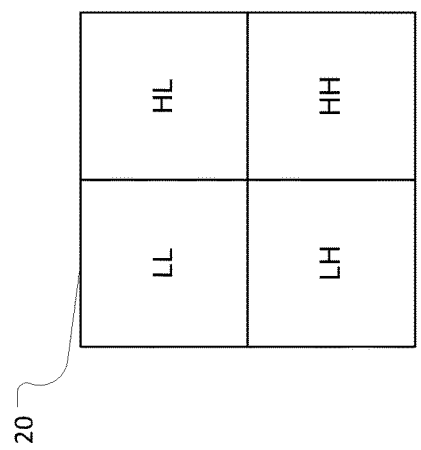
FIG. 2 shows an example of an image tile broken down into subbands.

The subbands shown in FIG. 2 represent different types of filtering. LL denotes low pass filtering in both the horizontal and vertical directions. HL denotes high pass filtering in the horizontal direction and low pass filtering in the vertical direction. Similarly, LH denotes low pass filtering in the horizontal direction and high pass filtering in the vertical region, and HH denotes high pass filtering in both directions.

The embodiments here use the subbands received in the compressed image data, typically stored in a memory 18 of the decoder 14, and the decoding element 19 analyzes them to determine a number of coefficients in each of some subset of the subbands. The subbands used here are all but the LL subband. A higher number of coefficients in a subband indicates a non-blurred image, resulting in a higher PVQ score. A blurred image reflects as a sparse percentage of coefficients in the subbands, indicating a lower PVQ score. By analyzing only 3 of the subbands, one can determine whether the image data is of high or low blur, without having to process all of the data. An image with low blur will have a high number of coefficients in the subbands, and an image with high blur will have a low number of coefficients.

Figure 3:
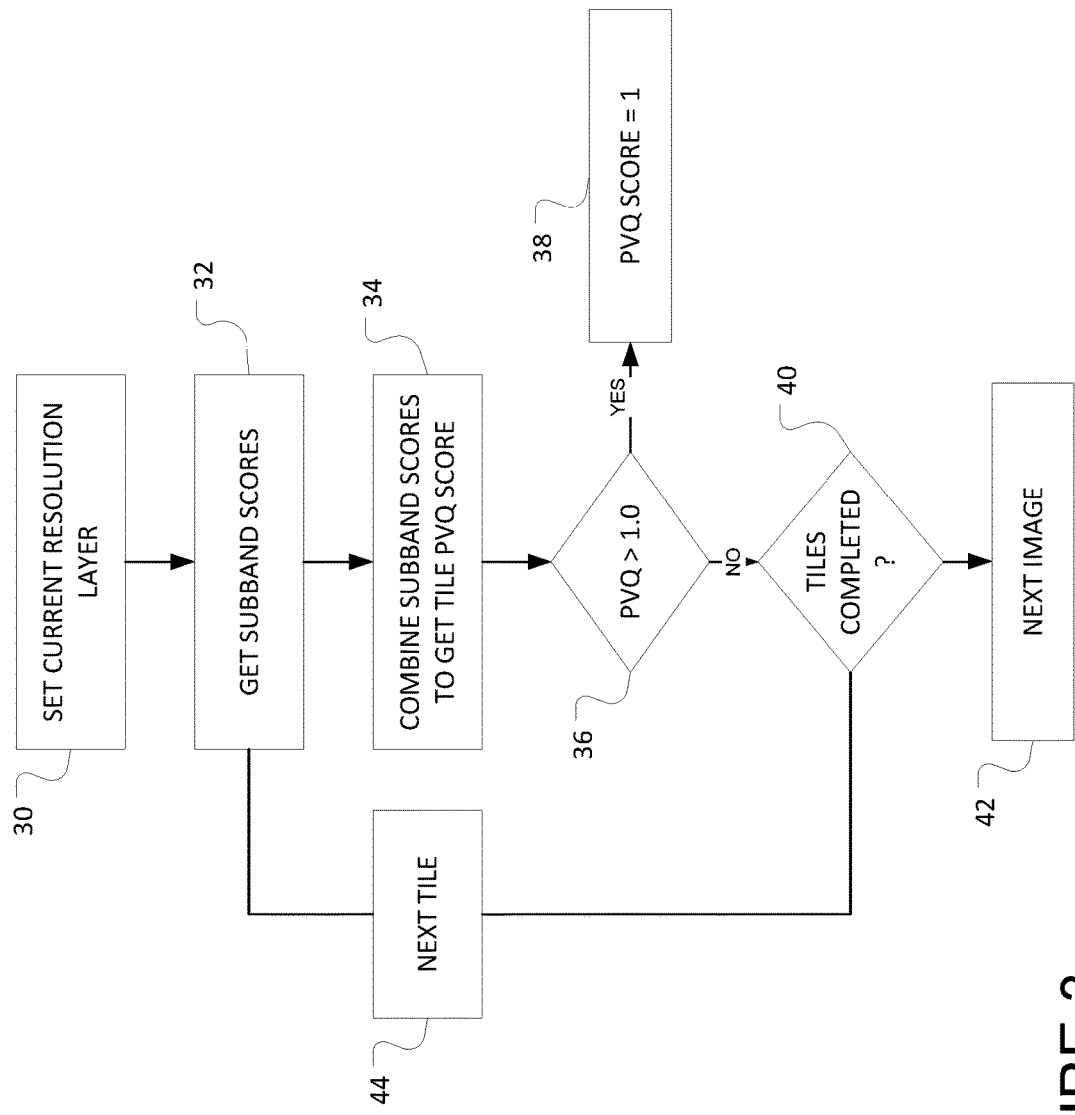
FIG. 3 shows a flowchart of an embodiment of a method to evaluate a number of coefficients in a reduced number of subbands.

FIG. 3 shows a flowchart of an embodiment of a method to determine blurriness in an image. Generally, the method is applied to the n−1 resolution layer. Most JPEG2K encoding occurs at multiple layers of resolution. In the discussion here, N denotes the resolution of the final decoded image, and the embodiments are performed on the resolution layer one layer, n−1, below the final resolution layer. Information would be progressively lost due to the two-dimensional low pass filtering. As the resolution decreases, what remains is mostly the low frequency component of the original image Looking for the presence of high frequency data, such as edges, in such components may only mislead the process. Further, in the lower resolution layers, the data is mostly 'synthetic' after successive transforms, and not the information as it exists in the original image data. However, the processing could be performed on several different resolution layers.

In FIG. 3, the process sets the current resolution layer at 30. The subband scores for each of the three subbands used are gathered at 32. These subband scores are combined to get the overall PVQ score for the tile. The individual subband scores may be weighted. In one embodiment, the HH subband score and the LH subband score were each multiplied by 3. This number was derived by experiments and may be changed as desired.

At 36, the combined PVQ is checked to see if it is greater than 1. If so, the PVQ score is set at 1 at 38. In the embodiments here, a PVQ score of 1 indicates an image with no blur, while a score of 0 indicates high blur. The embodiment here is applied one tile at a time. To apply the process to the whole image, the process checks to see if all the tiles are completed at 40. If yes, the process moves on to the next image at 42. If no, the next tile is then accessed at 44 and the process moves on until the entire image is processed.

Figure 4:
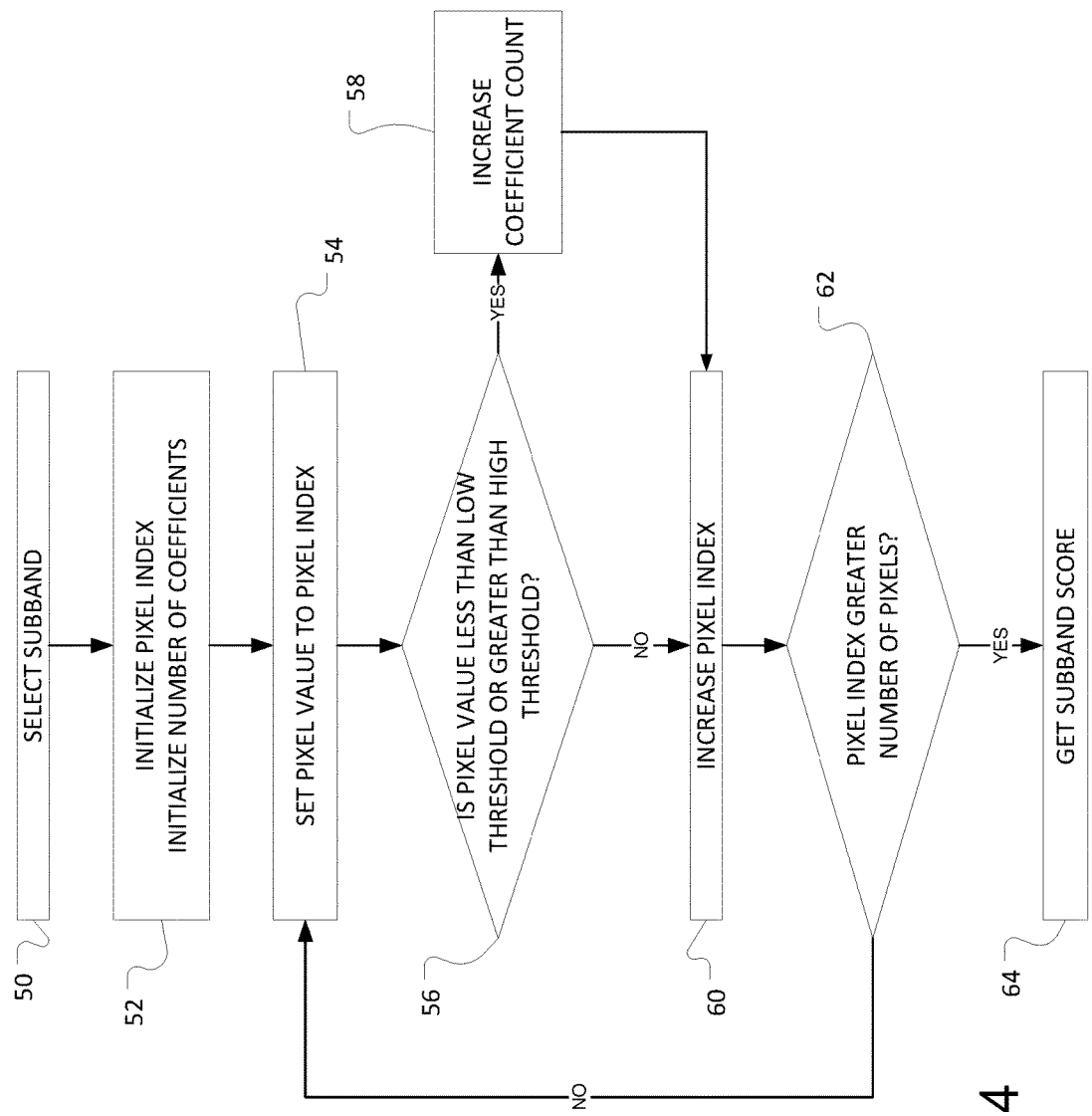
FIG. 4 shows a flowchart of an embodiment of a method to determine a number of coefficients in a subband.

The basis of the process of FIG. 3 includes determining a subband score. FIG. 4 shows one embodiment of a method of determining a subband score for a particular subband 50. The process tracks two different counters, one to track the pixel upon which the process operates, the pixel index, and one to track the number of coefficients within the subband. As each subband undergoes processing, these counters are initialized at 52. The pixel value is set equal to the subband data for the pixel corresponding to the pixel index at 54.

At 56, the process determines whether the pixel value is less than a low threshold or higher than a high threshold. The thresholds may be set based upon the type of image data, etc. In one embodiment the low threshold is set at 123 and the high threshold is set to 133 for 8-bit depth input data. If true, the coefficient count is increased at 58 and the pixel index is increased at 60. If not, only the pixel index is increased at 60. At 62, the process checks to see if any pixels remain in the tile that have not been processed. If the pixel index is greater than the number of pixels in the tile, the process completes and the ratio of the number of coefficients/number of pixels becomes the subband score at 64. If not, the pixel continues by returning to 54. This score is then used as the subband score in the process of FIG. 4.

In this manner, the process can determine automatically the blurriness of the image for a particular layer of resolution. This information can be used to select different types of encoding resident in the encoded data, or to change the layer of the resolution used to generate the final decoded image.

Variations and modification exist. The process can be further optimized by evaluating only those tiles the correspond to foreground regions of the image. The embodiments above focused on the luma component of decoded YUV data, but it could also act on the chroma component.

What is claimed is:

1. A method of detecting image quality in a wavelet transform-encoded image, comprising:
    receiving wavelet transform-encoded image data partitioned into tiles at a decoder, each tile partitioned into a number of subbands;
    evaluating, for each tile, a number of wavelets in a subset of the number of subbands, the subset consisting of fewer than the number of subbands;
    assigning a measure to each of the subbands evaluated for each tile; and
    using the measures to determine a perceptual visual quality score for the wavelet transform-encoded image data, by combining the measure for each of the subbands of the subset of the number of subbands into the perceptual visual quality score, wherein the determined perceptual visual quality score corresponds to an amount of blur;
    wherein assigning a measure to each of the subbands evaluated for each tile comprises:
        determining, for each pixel in the subband, whether the pixel value is less than a low threshold or higher than a high threshold and incrementing a coefficient counter when the pixel value is less than the low threshold or higher than the high threshold, and
        assigning the measure for the subband as a ratio of the coefficient counter value to the number of pixels in the subband.

2. The method of claim 1, further comprising assigning a weight to each tile, wherein the weight is based upon a relative importance of the tile in the wavelet transform-encoded image data.

3. The method of claim 1, wherein each tile is partitioned into four subbands.

4. The method of claim 3, wherein evaluating, for each tile, the number of wavelets in the subset of the number of subbands comprises evaluating the number of wavelets in three of the four subbands.

5. The method of claim 1, wherein evaluating, for each tile, the number of wavelets in the subset of the number of subbands comprises evaluating the number of wavelets in a luminance component of the wavelet transform-encoded image data.

6. The method of claim 1, wherein evaluating, for each tile, the number of wavelets in the subset of the number of subbands comprises evaluating the number of wavelets in both a luminance and a chroma component of the wavelet transform-encoded image data.

7. The method of claim 1, wherein evaluating, for each tile, the number of wavelets in the subset of the number of subbands comprises evaluating the wavelet transform-encoded image data occurring in a resolution layer lower than the final resolution layer used by the decoder to generate the final decoded image.

8. The method of claim 1, wherein evaluating, for each tile, the number of wavelets in the subset of the number of subbands comprises evaluating the wavelet transform-encoded image data occurring in each of several resolution layers.

9. The method of claim 1, wherein evaluating, for each tile, the number of wavelets in the subset of the number of subbands is performed only on those tiles that correspond to a foreground region of the wavelet transform-encoded image data.

10. A decoding system, comprising:
    a memory to receive wavelet-transformed compressed image data having a predetermined number of subbands; and
    a decoder to:
        determine a number of wavelet coefficients in a subset of the predetermined number of subbands; and
        measure an amount of blur in the wavelet-transformed compressed image data based upon the number of wavelet coefficients; and
        wherein measuring an amount of blur in the wavelet-transformed compressed image data based upon the number of wavelet coefficients comprises:
            determining, for each pixel in each subband of the subset of the predetermined number of subbands, whether the pixel value is less than a low threshold or higher than a high threshold and incrementing a respective subband coefficient counter when the pixel value is less than the low threshold or higher than the high threshold, calculating a subband score for each subband of the subset of the predetermined number of subbands, wherein the subband score for each subband is a ratio of the respective subband coefficient counter value to the respective number of pixels in the subband, and
combining the subband scores for each subband of the subset of the predetermined number of subbands into the measured amount of blur.

* * * * *